United States Patent [19]

Lance et al.

[11] Patent Number: 5,692,932
[45] Date of Patent: Dec. 2, 1997

[54] PROPULSION GAITER FOR FLOAT FISHERMEN

[76] Inventors: Randy M. Lance, Rt. 3, Box 523-C, Pottsboro, Tex. 75076; Billy D. Fowler, Rt. 2, Box 306, Ada, Okla. 74820

[21] Appl. No.: 583,837

[22] Filed: Jan. 11, 1996

[51] Int. Cl.$^6$ ................................................. A63B 31/12
[52] U.S. Cl. ........................................ 441/60; 114/351
[58] Field of Search ........................... 441/55, 56, 57, 441/58, 59, 40, 65, 66, 67; 114/351, 346, 345

[56] References Cited

U.S. PATENT DOCUMENTS

| | | | |
|---|---|---|---|
| 1,711,307 | 4/1929 | Dabrowski | 441/60 |
| 1,794,883 | 3/1931 | Corder et al. | 114/351 |
| 1,909,259 | 5/1933 | Feir | 441/60 |
| 2,898,611 | 8/1959 | Mooney | 441/60 |
| 3,015,829 | 1/1962 | Gronkowski | 441/60 |
| 3,286,287 | 11/1966 | Martin | 441/60 |
| 3,424,133 | 1/1969 | Brady | 441/60 |
| 5,338,235 | 8/1994 | Lee | 441/60 |

*Primary Examiner*—Stephen Avila
*Attorney, Agent, or Firm*—Jerry C. Ray

[57] ABSTRACT

A propulsion device for persons in an upright position in water has a loose flexible panel within a reinforced border; the panel is attached to the frontal lower leg by a knee strap at its top and by ankle and foot straps at its bottom. Walking or striding motions of the wearer's legs cause the material of the panel to billow out and provide resistance against the water when the wearer's leg moves backward, propelling the wearer forward through the water; the panel collapses against the leg and conforms to its shape when the leg is moved forward, offering little or no increased resistance to the water.

3 Claims, 2 Drawing Sheets

PROPULSION GAITER FOR FLOAT FISHERMEN

CROSS REFERENCE TO RELATED APPLICATIONS

None.

BACKGROUND OF THE INVENTION

1. Field of the Invention

This invention relates to devices for propelling a person through water, and particularly to such devices for use by persons who are supported by a float in an upright position in the water.

2. Description of the Related Art

The sport of float fishing, or tube fishing, is growing in popularity. The equipment required is lightweight and can be carried to remote locations. In the water, the fisherman is supported by a harness attached to a float; the float may be a circular tube or of a shape specially designed for float fishing.

A problem encountered by all float fishermen is that of mobility once in the water; movement over long distances is not a goal, but the ability to move through the water for short distances, and/or to hold one's position against the wind, is necessary. Paddling is difficult because the fisherman must hold his fishing gear while trying to maneuver with the paddle. What is needed, therefore, is a lightweight device for use on the fisherman's legs to enable him to move through the water using a striding motion, leaving his arms free for fishing.

Several patents have been issued on devices to help propel a swimmer through the water. These are generally not applicable to the problem described above, as a swimmer is in a prone position while the float fisherman is in a sitting or standing position. Of the patents known to applicant, only Schneider discloses a device for use in an upright position; it is a shoe with an attached resilient fin which opens to catch the water.

Applicant's pre-examination search developed the following patents, here listed for consideration by the Examiner:

| Patent Number | Issue Date | Patentee |
| --- | --- | --- |
| 1,124,887 | Jan. 12, 1915 | Grady |
| 1,130,209 | Mar. 2, 1915 | Sommerfeld |
| 1,260,931 | Mar. 26, 1918 | Melhus |
| 1,411,909 | Apr. 4, 1922 | Condon |
| 1,550,542 | Aug. 18, 1925 | Haines |
| 1,827,308 | Oct. 13, 1931 | Dorris |
| 3,835,493 | Sep. 17, 1974 | Grivna |
| 4,664,639 | May 12, 1987 | Schneider |
| 5,388,235 | Aug. 16, 1994 | Lee |

SUMMARY OF THE INVENTION

The invention provides means for float fishermen to propel themselves through the water by moving their legs in a walking motion. Made from synthetic fabric such as nylon, the equipment is very lightweight and is easily carried to fishing locations accessible only on foot.

A pair of gaiter-like devices have loose, flexible panels within a reinforced border; the top and bottom sections of the border extend to form straps which buckle around a wearer's leg. Each gaiter is held in position by a foot strap which passes under the instep of the wearer's foot. Strapped in place on the front of a fisherman's leg, the panel opens like a parachute against the water when the leg moves back, and collapses against the leg when the leg moves forward. Fabric in the panel is loose relative to the reinforcing border of the panel; i.e., the panel is oversized relative to the dimensions of the border. The looseness allows the panel to billow open like a sail against the wind, so the fisherman pushes against the water to move forward.

An object of this invention is to provide a device for propelling float fishermen through the water using a minimum of lightweight equipment.

Another object is to provide means for anyone on a flotation device to move themselves through the water using a walking motion.

Further objects are to achieve the above with a device that is sturdy, compact, durable, simple, safe, efficient, and reliable, yet inexpensive and easy to manufacture and operate.

The specific nature of the invention, as well as other objects, uses, and advantages thereof, will clearly appear from the following description and from the accompanying drawings, the different views of which are not necessarily scale drawings.

CATALOG OF THE ELEMENTS

Figure 1:
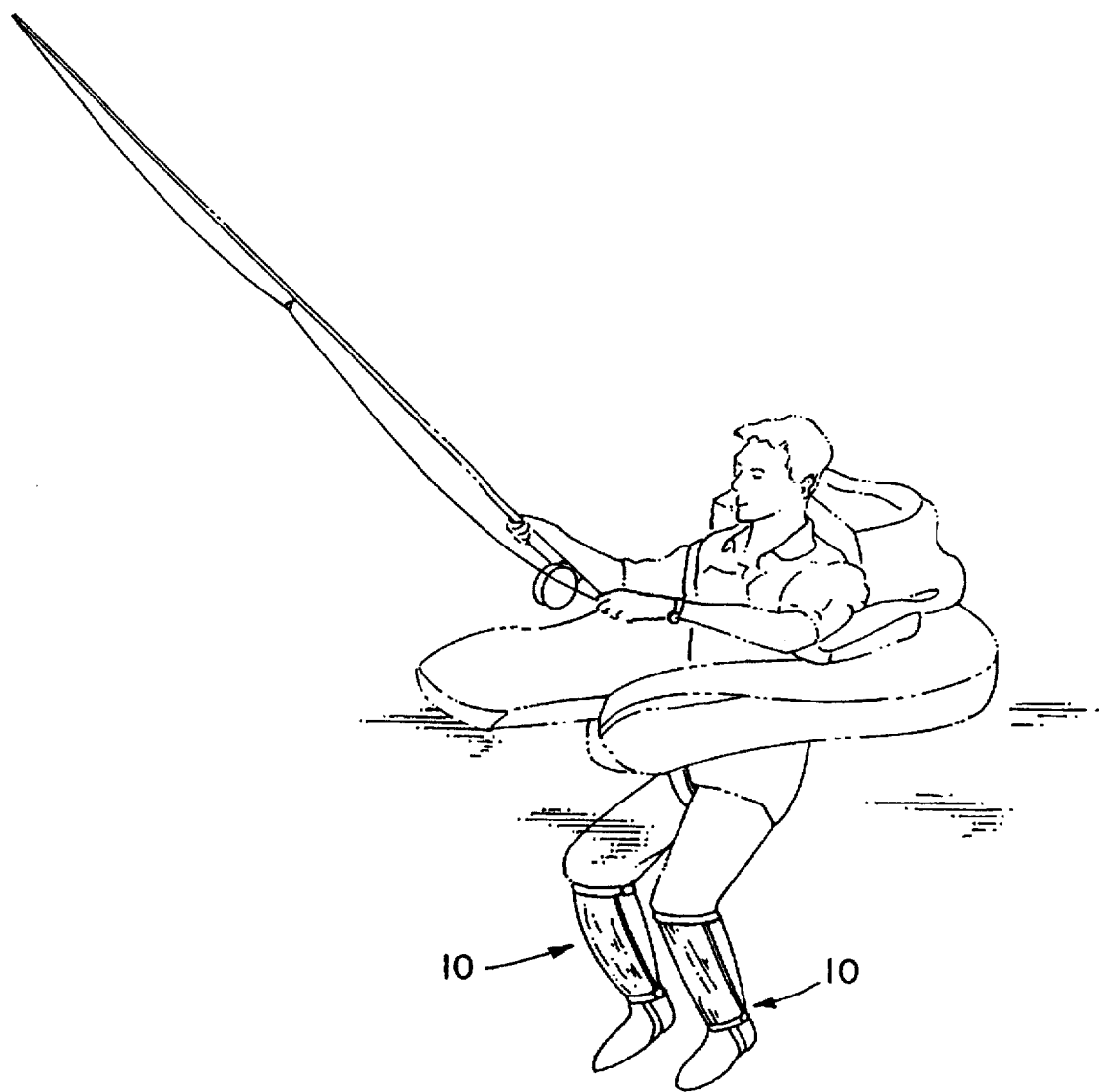
FIG. 1 is a perspective of a fisherman using a flotation device.

To aid in the correlation of the elements of the invention to the exemplary drawings, the following catalog of the elements is provided:

10 gaiter
12 panel
14 reinforced border
16 knee strap
18 ankle strap
20 foot strap
22 fastener

DESCRIPTION OF THE PREFERRED EMBODIMENTS

Referring to the drawings, FIG. 1 shows a float fisherman supported in a flotation device. Difficulties with paddling such a float are apparent from a study of the drawing. On each leg the fisherman wears a flexible gaiter 10 which opens to catch the water when a leg is moved backwards, so the fisherman is propelled forward. When the leg is moved forward in a striding or walking motion, the gaiter collapses against the leg, offering little resistance to the water.

Figure 2:
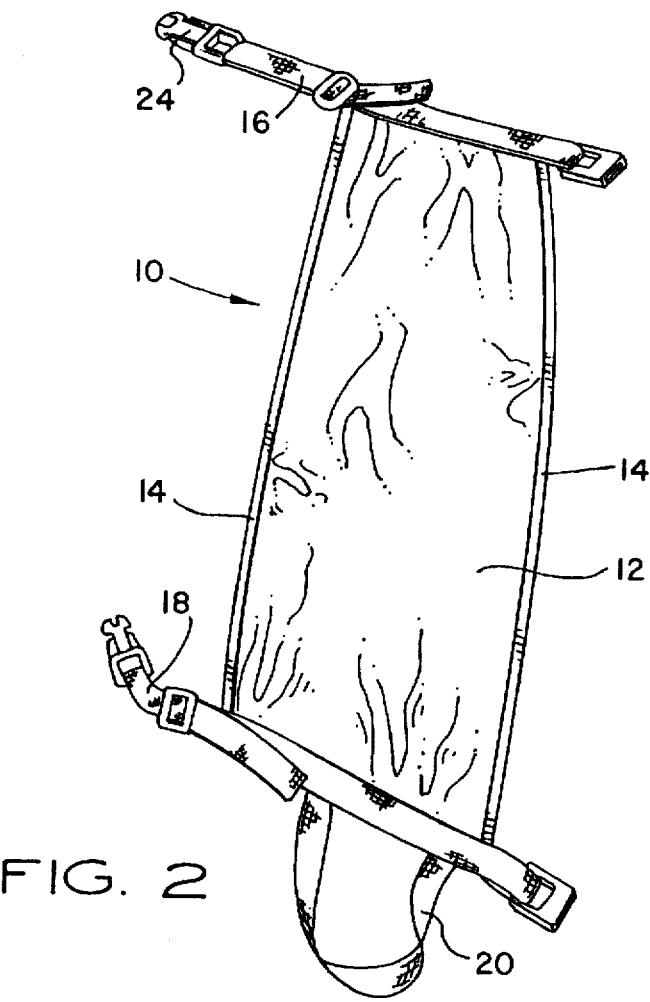
FIG. 2 is a perspective of the gaiter.

Referring to FIG. 2, the gaiter 10 includes a flexible panel 12 of waterproof material. In the preferred embodiment, the panel 12 is made of rip-stop nylon or a similar tough, waterproof fabric. A reinforced border 14 surrounds and supports the panel 12, forming a perimeter which defines the external dimensions of the panel. The panel is attached to the border by sewing or by other means; the border is made of several layers of the same material as the panel, or of some other suitable material. As described below, the side portions of the reinforced border 14 may be stiffened relative to the fabric in the panel.

The dimensions of the panel 12, before being attached to the reinforced border 14, are greater than that of the border. That is, the panel has an excess of fabric relative to the dimensions of the border, so that the fabric in the panel is slack relative to the reinforced border, even when the border is taut. In the alternative, no slack is provided in the panel; movement of the border allows the panel to billow out for increased resistance against the water.

At the top and bottom edges of the panel 12, the reinforced border 14 extends to form straps for attaching the gaiter to a fisherman's leg, between knee and ankle. The top strap, or knee strap 16, passes around the leg just below the knee; the ends of the strap are connected by heavy-duty, bayonet-type fasteners 22 for easy connection and disengagement of the strap. The lower, or ankle strap 18, is attached around the ankle.

Figure 3:
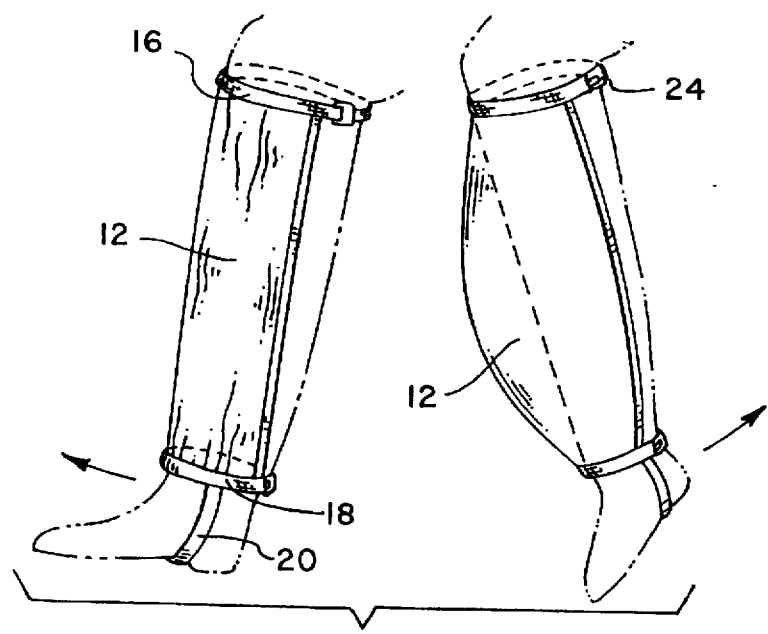
FIG. 3 is a detail showing the water propulsion gaiters on a person's legs.

A foot strap 20, attached to the bottom of the gaiter at right angles to the ankle strap 18, passes under the instep of the fisherman's foot. The foot strap 20 ensures that the gaiter stays in position on the fisherman's leg by preventing the lower end of the gaiter from moving up on the leg, and by preventing the gaiter from rotating on the leg. As shown in FIG. 2 and FIG. 3, the foot strap 20 is sewn or otherwise connected to the ankle strap 18, with the ends of the foot strap positioned so that the foot strap matches the position of a wearer's instep.

The length of knee and ankle straps are adjustable to fit various leg sizes. Adjustment is provided at the point where the straps attach to the releasable fasteners 22. The foot strap 20 may be adjustable; in the preferred embodiment the foot strap has some degree of elasticity to facilitate pulling it over a shoe.

One function of the foot strap 20 is to anchor the bottom of the gaiter 10 in a particular position. The position of the gaiter top is determined by the knee strap 16; the length of the gaiter is such that when the knee strap is fastened above the wearer's calf (just below the knee), the border strips at the sides of the panel are somewhat slack.

In one embodiment, the side portions of reinforced border 14 are constructed to have a slight curvature or bias away from the wearer's leg. The curvature may be accomplished by use of a "gathering stitch" when the border is sewed, or by the inclusion of a rod or strip of stiffening material within the layers of material comprising the reinforced border. The convex side of the curved border is positioned next to the wearer's leg, so the border is biased away from the leg. The result is that the border opens more easily to trap water when the wearer moves his legs as described below, and also allows water to escape from the gaiter readily.

In use, the sides of the panel billow open against the force of the water when the wearer moves his legs in a striding motion. Opening the panel is caused by water entering the panel, flowing between the side sections of the border and the wearer's leg. The position of the knee strap is such that the side portions of the border are somewhat slack, to allow the easy entrance and exit of water. Side portions of the reinforced border 14 may have some degree of stiffness and/or a built-in curvature as described above so that they bow away from the wearer's leg to more effectively trap water during the backward movement of the leg.

As the panel 12 fills with water and opens outward like a parachute, drag against the water increases. The resistance, of course, causes the fisherman's body to move forward through the water. As the fisherman moves his leg forward, the panel collapses against the front part of the leg and conforms to the shape of the leg, so that the leg when moving forward has minimal added resistance due the gaiter. Where the side portions of the border are somewhat stiff as described above, the panel snaps open quickly and quickly collapses, so that water is provided an easy entry to and exit from the panel.

The embodiments shown and described above are only exemplary. Various modifications can be made in the construction, material, arrangement, and operation, and still be within the scope of my invention. The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. An apparatus for propelling a person in an upright position through water by a striding motion of the person's legs, comprising:
    a) a flexible panel having a top and a bottom.
    b) a resilient reinforced border around a perimeter of said panel, said border being relatively stiffer than said panel,
    c) a top strap integral with a portion of said reinforced border at a top of said panel,
    d) a bottom strap integral with a portion of said reinforced border at a bottom of said panel, said top strap and said bottom strap for attaching said panel to a wearer's leg,
    e) at least one side portion of said reinforced border being biased away from the wearer's leg, and
    f) said panel having an excess of material relative to the dimensions of said border so that said panel remains slack when said border is taut.

2. The invention as described in claim 1, wherein said means for attaching include:
    m) a foot strap integral with and extending from a portion of said reinforced border at either side of said panel, and
    n) releasable fasteners on said knee strap and on said ankle strap.

3. The invention as described in claim 2, wherein:
    p) said fasteners include means for adjusting a length of said straps.

* * * * *